United States Patent [19]

Conte

[11] Patent Number: 5,560,432
[45] Date of Patent: Oct. 1, 1996

[54] STEERING CLUTCH FOR SMALL AGRICULTURAL IMPLEMENTS

[76] Inventor: Ernest R. Conte, 8901 Lighter Knot Dr., Lake Wales, Fla. 33853

[21] Appl. No.: 508,445

[22] Filed: Jul. 28, 1995

[51] Int. Cl.[6] .................................................... F16D 11/06
[52] U.S. Cl. .................... 172/103; 192/69.7; 192/69.82; 192/99 S; 56/11.8
[58] Field of Search .......................... 192/66.1, 69, 69.4, 192/69.71, 69.8, 69.82, 66.22, 69.7, 114 R, 114 T; 172/103, 104; 56/10.4, 11.8, 11.7

[56] References Cited

U.S. PATENT DOCUMENTS

| | | | |
|---|---|---|---|
| 294,672 | 3/1884 | Proctor et al. | 192/69.71 X |
| 743,078 | 11/1903 | Henn | 192/69.82 X |
| 876,053 | 1/1908 | Heard | 192/69.82 X |
| 991,577 | 5/1911 | Whitehead et al. | 192/114 X |
| 1,563,707 | 12/1925 | Hohl | 192/69.8 |
| 1,597,198 | 8/1926 | Howell | 192/69.82 X |
| 1,772,996 | 8/1930 | Heinmiller | 172/103 X |
| 2,644,562 | 7/1953 | Pettus | 192/69.8 X |
| 2,989,127 | 6/1961 | Oertle, Jr. | 172/103 X |
| 3,210,040 | 10/1965 | Thurlow | 192/69.7 X |
| 3,216,278 | 11/1965 | Plume | 192/69.82 X |
| 3,360,065 | 12/1967 | Wyman | 192/69.82 X |
| 3,543,489 | 12/1970 | Maier et al. | 56/10.4 |
| 3,982,443 | 9/1976 | Fitch | 192/69.91 X |
| 4,474,218 | 10/1984 | Sample | 192/69.82 X |
| 4,566,566 | 1/1986 | Vuillet | 192/69.7 X |
| 4,895,210 | 1/1990 | Witzel | 172/256 |
| 5,085,305 | 2/1992 | Cheng | 192/69.82 |
| 5,095,996 | 3/1992 | Sprinkle | 172/42 |
| 5,137,366 | 8/1992 | Hill et al. | 192/69.82 X |

*Primary Examiner*—Terry Lee Melius
*Assistant Examiner*—Christopher J. Novosad
*Attorney, Agent, or Firm*—David Kiewit

[57] ABSTRACT

A steering clutch assembly attached between an axle and a wheel of a rear-tined rotary tiller allows the implement to be steered. The clutch assembly comprises three coaxial tubular elements, the inboard-most of which is affixed to one of the driven shafts and the outboard-most of which is affixed to a stub axle projecting from a wheel. The inboard and outboard tubular members are connected at a joint that allows the outboard member to freely rotate about the axis of the shaft. An intermediate tubular member rotates with the inboard tubular member and is translated between and engaged and a disengaged position. In the engaged limiting position a portion of the intermediate tubular member bears on a portion of the outboard tubular member and rotationally locks those two tubular members together so that the outboard tubular member is prohibited from rotating with respect to the inboard tubular member. In a disengaged limiting position the intermediate tubular member does not engage the outboard tubular member so the outboard tubular member is free to rotate with respect to the other two tubes. This free rotation of the outboard tubular member and its affixed wheel allows the tiller to be manually turned by the operator.

6 Claims, 2 Drawing Sheets

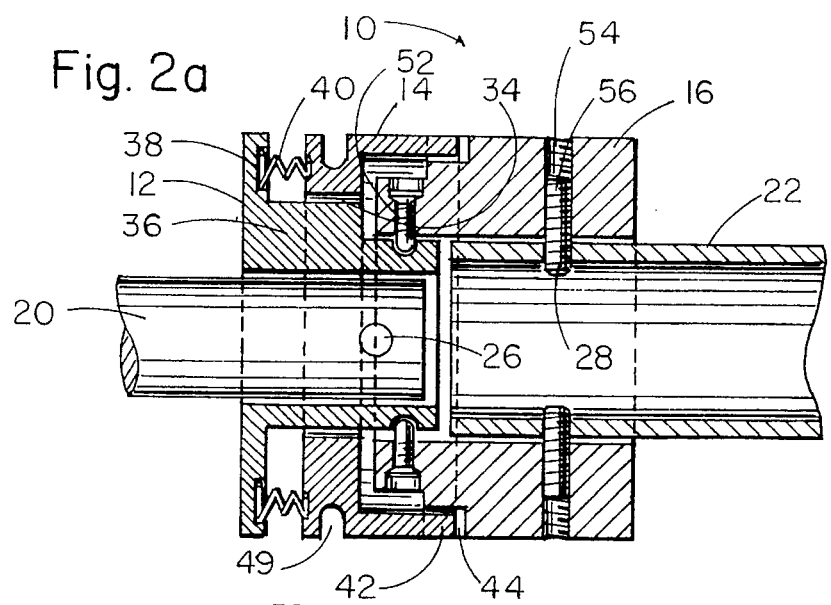
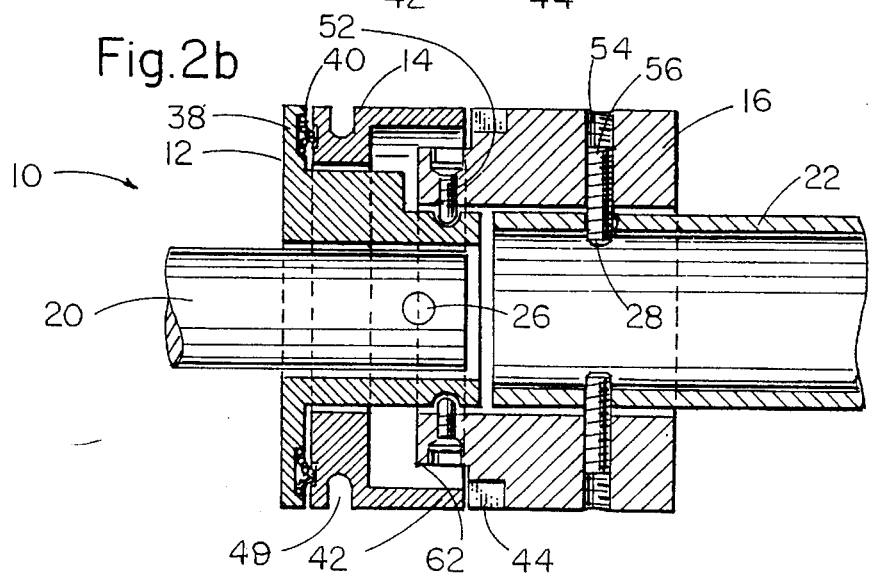
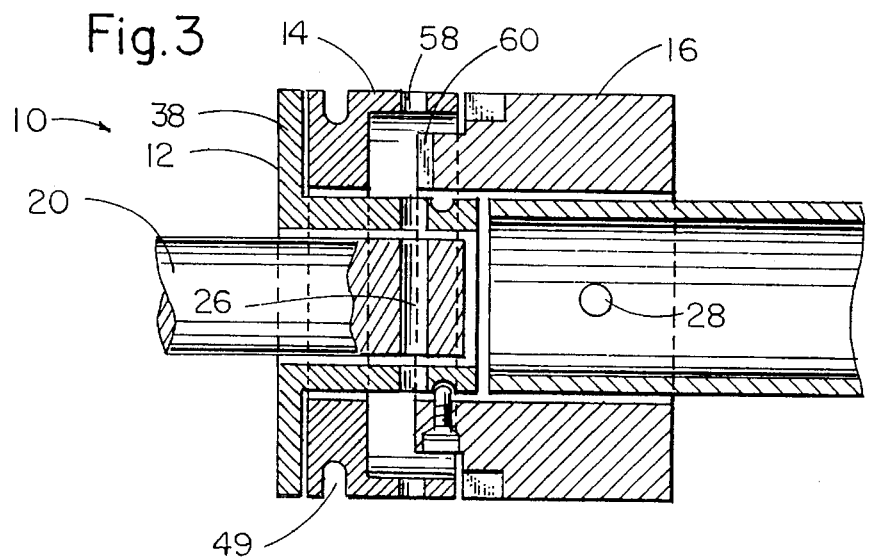

STEERING CLUTCH FOR SMALL AGRICULTURAL IMPLEMENTS

BACKGROUND OF THE INVENTION

1. Field of the Invention

The invention provides means of steering a self-propelled, user-guided agricultural implement such as a rotary garden tiller.

2. Description of Related Art

Well-known rotary garden tillers are commonly built with a straight-through axle projecting through a transmission case—i.e., these implements are built without a differential, and are therefore difficult to steer. Various approaches have been proposed to improve the handling and maneuverability of these implements. Notable among the patent teachings in this area are:

- U.S. Pat. No. 4,895,210, wherein Witzel discloses right and left clutch-brake units arranged symmetrically at each side of and adjacent the transmission case of a rear-tined rotary tiller. The disclosure of U.S. Pat. No. 4,895,210 is herein incorporated by reference.
- U.S. Pat. No. 5,095,996, wherein Sprinkle discloses a generally forward-facing rotary turntable attachment for turning a rotary tiller. Turning is accomplished by pivoting the tiller about its axle onto the turntable, rotating the tiller about a vertical axis until it is turned to the desired direction, arid then pivoting the tiller back onto its wheels to resume normal operation.

SUMMARY OF THE INVENTION

A steering clutch assembly attached intermediate an axle and a wheel of a rotary tiller allows the implement to be steered. The clutch assembly comprises three coaxial tubular elements, the inboard-most of which is affixed to one of the driven shafts and the outboard-most of which is affixed to a stub axle projecting from a wheel. The inboard and outboard tubular members are journalled together by means allowing the outboard member to freely rotate about the axis of the shaft. An intermediate tubular member is disposed external to the inboard tubular member and rotates therewith. The intermediate tubular member is translated between two limiting positions and is biased into an engaged limiting position by biasing means, such as a plurality of coil springs. In the engaged limiting position a portion of the intermediate tubular member bears on a portion of the outboard tubular member and rotationally locks those two tubular members together so that the outboard tubular member is prohibited from rotating with respect to the inboard tubular member. In a disengaged limiting position the intermediate tubular member does not engage the outboard tubular member and the outboard tubular member is free to rotate with respect to the other two tubes.

It is an object of the invention to provide steering clutch apparatus selectively operable to disengage one of the wheels of a rear-tined rotary tiller from its respective driven shaft when the shaft is not being driven by the engine (e.g., when the conventional traction clutch is disengaged), the tiller thereafter being manually turned either to the left or to the right by the operator.

It is a further object of the invention to provide steering clutch apparatus selectively operable to disengage one of the wheels of a rotary tiller from its respective driven shaft when the shaft is being driven by the engine, the tiller thereupon turning toward that side on which the disengaged steering clutch is mounted.

It is an additional object of the invention to install steering clutch apparatus intermediate a straight-through axle and a wheel having a sleeved stub axle initially disposed about and pinned to the axle, the apparatus installed without first being disassembled.

It is yet a further object of the invention to install steering clutch apparatus intermediate a straight-through axle and a wheel having a sleeved stub axle initially disposed about and pinned to the axle, the clutch apparatus adding a minimum amount to the effective length of the wheel-shaft—i.e., to the wheel track of the tiller.

DESCRIPTION OF THE DRAWING

FIG. 2b of the drawing is a cross-sectional view, taken along line 2—2 of FIG. 1, of the clutch of the invention in a disengaged position.

FIG. 3 of the drawing is a cross-sectional view, taken along line 3—3 of FIG. 1, of the clutch of the invention showing detail on how the clutch is installed intermediate the drive axle and the wheel axle sleeve.

DESCRIPTION OF THE PREFERRED EMBODIMENT

Figure 1:
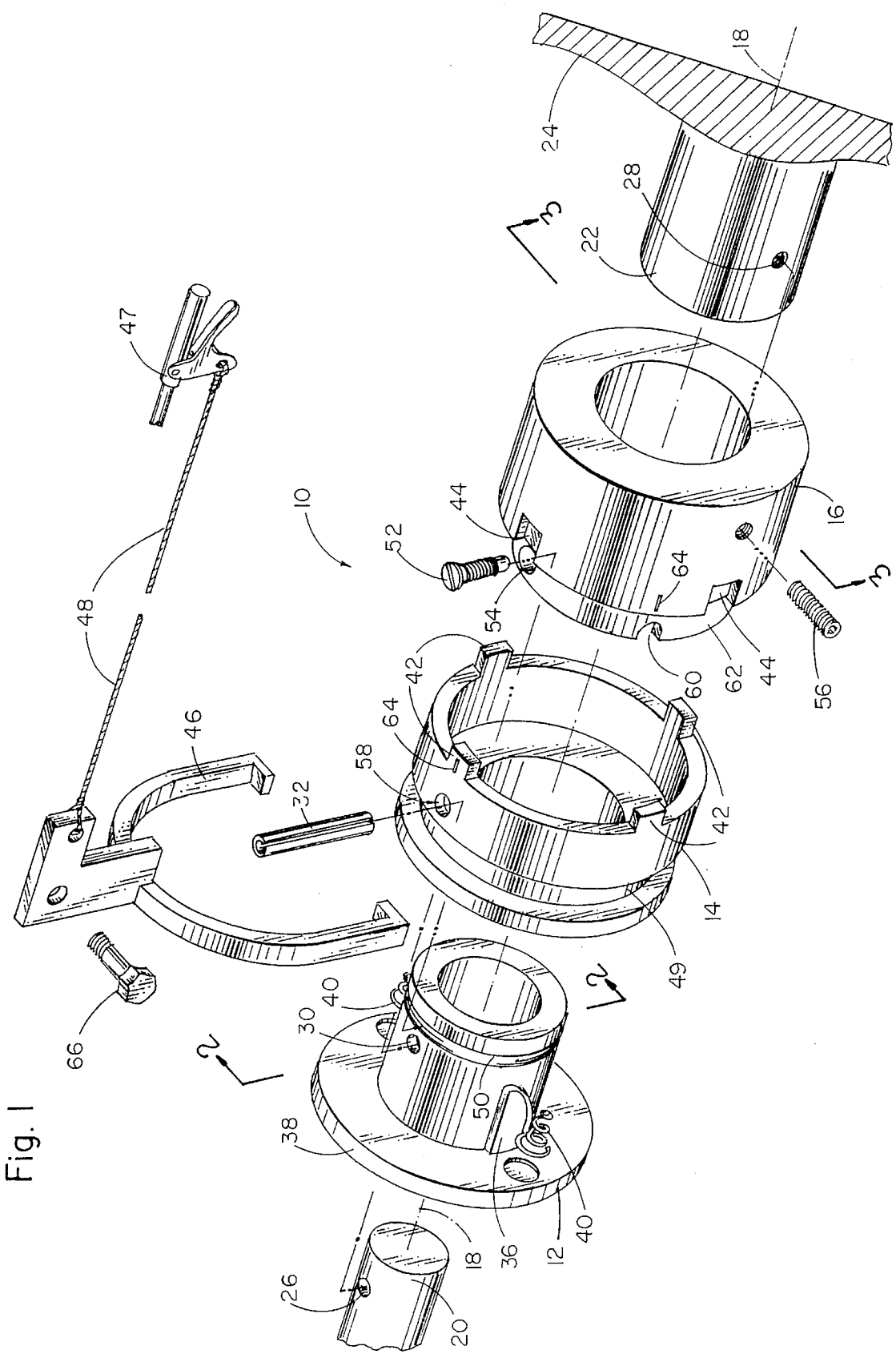
FIG. 1 of the drawing is an exploded perspective view of a steering clutch of the invention installed intermediate a driven axle and a stub sleeve axle attached to a wheel that is shown partly in section, FIG. 2a of the drawing is a cross-sectional view, taken along line 2 2 of FIG. 1, of the clutch of the invention in an engaged position.

A rotary tiller, as used hereinafter, is a self-propelled agricultural implement guided by a walking attendant, the implement travelling over the ground along a line of advance and having a transmission casing including a straight-through axle projecting laterally outward from the casing as right and left driving shafts. In one popular rotary tiller design each of the shafts has a ground-engaging wheel attached to it. In this rear-tined rotary tiller the powered wheels move the implement over the ground while tines extending generally radially outward from a separately driven axle, located behind the wheeled axle, till the ground. In another known design for a rotary tiller, which is less popular as it is not compatible with driving the implement across a paved surface, only a single axle is employed, and one or more tined wheels are mounted on each of its driven shafts. In both cases each of the wheels, be they tined or tired, are usually attached to respective driven shafts by means of a fastener extending transversely to the shaft axis through aligned throughholes in the shaft and in the sleeve-like stub axle on which the wheel is mounted. In both cases a traction clutch is conventionally interposed between the engine and the driven shafts.

It will be appreciated that although it is conventional in rotary tiller design to mount the wheel on a sleeved stub axle fitting around and pinned to a solid driving shaft, one could also construct a rotary tiller using a variety of other design choices, such as having a sleeved driving shaft into which a solid stub wheel axle is inserted.

Turning now to FIG. 1 of the drawing one finds an exploded view of a steering clutch 10 comprising three tubular members 12, 14, 16, each of which is coaxial with the axis 18 of a driven shaft 20 and of a sleeved stub axle 22 projecting from a wheel 24. Prior to the installation of the clutch 10, the wheel 24 of the tiller is attached directly to the driven shaft 20 by aligning throughholes 6, 28 in the shaft 20 and stub axle 22 and inserting a pin therethrough. As will be explained in greater detail hereinafter, the clutch 10 may be retrofitted onto a pre-existing rotary tiller, and is therefore designed to cause a minimal increase in the track width of the implement.

The inboard tube 12 of a preferred steering clutch 10 is made with a transverse throughhole 30 having the same size as the throughhole 26 in the driven shaft 20. Thus, the inboard tube 12 may be pinned to the shaft 20 by a roll pin 32 having a length chosen to not extend radially outward beyond the inboard tube 12. This insertion arrangement is shown in FIG. 1 of the drawing by arrows interspersed with single dots. The limitation on the preferred length of the roll pin 32 allows the intermediate tubular member 14 to translate freely to and fro along the axis 18. It will be recognized that if the roll-pin 32 were longer and were aligned with a keyway 34 in the interior surface of the intermediate tube 14, the roll pin 32 could serve the same function as is provided by the key 36 shown in the drawing.

The intermediate tube 14 is prohibited from rotating relative to the inboard tube 12 by the combination of the key 36 and keyway 34 shown in the drawing, or by other known rotation-locking means (e.g. by splining the inboard 12 and intermediate 14 tubes together), but can translate along the axis 18. In its normally engaged position, the intermediate tube 14 is biased away from a pressure plate 38 on the inboard end of the inboard tube 12 by bias springs 40 so that teeth 42 on the outboard end of the intermediate tube 14 engage corresponding detents 44 on an inboard-facing surface of the outboard tube 16. The clutch 10 may be disengaged by moving the intermediate tube 14 in an inboard direction against the bias springs 40. This may be done by means of a clutch fork 46 pivotally mounted to the body of the tiller, or by another known actuator controlled by the operator (e.g., with the well known combination of a spring-biased caliper 47 manually actuated to apply tension to a cable 48). The clutch fork 46 rides in a fork slot 49 and has a size and position chosen so that the fork 46 does not bear on the clutch 10 except when employed by the operator translate the intermediate tube 14 into its disengaged position.

It will be recognized that a wide variety of functionally equivalent clutch facings can be used instead of the illustrated combination of teeth 42 and detents 44. Many of these will comprise serrate surface portions having a variety of serration profiles, the serrate surface portions disposed adjacent both the outboard end of the intermediate tube 14 and the inboard end of the outboard tube 16.

The outboard tube 16 is journalled about the inboard tube 12 for free rotation about the axis 18—e.g., by the illustrated combination of a slot 50 in the inboard tube 12 and a plurality of pins or set-screws 52 extending through radial holes 54 in the outboard tube 16 (This joining arrangement is shown in FIG. 1 of the drawing by arrows interspersed with double dots). Aside from whatever incidental play may be associated with the rotary connection means of choice, the outboard tube 16 is translationally locked to the inboard tube 12 and can not be translated along the rotational axis 18 independently of the inboard tube 12.

Thus, when the steering clutch 10 is disengaged, the outboard tube 16 and its associated wheel 24 (to which it is affixed by suitable pins or screws 56 extending radially through the tube 16 and into the throughhole 28 in the stub axle) rotate independently of the driven shaft 20. A preferred arrangement for affixing the outboard tube 16 to the axle 22 is shown in FIG. 1 of the drawing by arrows interspersed with triple dots. When the steering clutch 10 is engaged, the outboard tube 16 is rotationally locked to the intermediate tube 14, which is always rotationally locked to the driven shaft 20.

It will be appreciated by those skilled in the art that the same steering clutch 10 could be used if a tubular member 12 comprising the pressure plate 38 and rotationally locked to the intermediate tubular member were attached to the wheel 24, rather than to the driven shaft 20. That is, the adjectives "inboard" and "outboard", as used in the description of the preferred embodiment supra could be systematically interchanged and the description would refer to an equivalent structure having the same function.

The preferred steering clutch 10 is assembled by placing springs 40 on the pressure plate 38, sliding the intermediate tube 14 about the inboard tube 12, positioning the outboard tube 16 so that its reduced diameter portion 62 is disposed radially between the intermediate 14 and inboard 12 tubes, and installing set screws 52 into appropriate holes 54. The intermediate tube 14 is then moved against the bias springs 40 and rotated into a predetermined disengaged position in which the teeth 42 and detents 44 are not aligned and in which the access hole 58, in the intermediate tubular member clearance slot 60 disposed on the inboard end of the outboard tubular member and throughhole 30 are aligned. Although it is expected that the clutch assembly 10 will be set in the predetermined position when it is shipped, a preferred embodiment may incorporate suitable fiduciary marks 64 on the intermediate 14 and outboard 16 tubes so the preferred alignment can be re-established at the time of installation onto a rear-tined rotary tiller.

To avoid clutch disassembly at the time of installation, the intermediate tube 14 is made with an access hole 58 usable both for inserting the pins or set screws 52 into the slot 50 to form the freely rotating joint between the inboard 12 and outboard 16 tubes, and for inserting the roll pin 32 into the inboard tube 12 and shaft 20. Additionally, a clearance slot 60 is provided in a reduced-diameter portion 62 of the outboard tube 16. Thus, a selfaligned steering clutch 10 can be installed on a tiller by removing the wheel 24, placing the steering clutch 10 on the driven shaft 20, inserting the roll pin 32 through the aligned apertures 58, 60, 30, 26 to an appropriate depth, inserting the wheel sleeve 22 into the outboard tube 16, and )inning the wheel sleeve 22 and outboard tube 16 together.

In a preferred embodiment, the specific shape and size of the clutch fork 46 are chosen so that a bolt 66 already present in the transmission case of the rear-tined rotary tiller onto which the clutch 10 is to be installed can be used as the pivotal mounting point for the fork 46. This choice of design adds to the ease of installation by ensuring that the installer does not have to drill holes in any part of the rotary tiller in order to install the clutch 10.

In a preferred method of operation a rear-tined rotary tiller equipped with the steering clutch 10 of the invention and travelling over the ground in a first direction of advance may be turned by: a) disengaging the traction clutch (not shown) and thereby halting the tiller's advance and allowing the wheels 24 and driven shafts 20 to be rotated together, but independently of the engine; b) disengaging the steering clutch 10 to allow the two wheels 24 to turn independently of each other; c) manually turning the tiller to the desired new direction of advance: d) re-engaging the steering clutch 10; and e) re-engaging the traction clutch.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is desired to be secured by Letters Patent is:

1. A clutch for a rotary tiller, the clutch installed intermediate a driven shaft and a wheel assembly comprising a stub axle, the driven shaft and the wheel rotating about a common axis, the clutch comprising an inboard tubular member affixed coaxially to the driven shaft, an outboard tubular member affixed coaxially to the stub axle, the outboard tubular member connected to the inboard tubular member by means permitting rotation therebetween and prohibiting axial translation therebetween, a third tubular member disposed about the common axis and translating therealong between an engaged position in which the third tubular member coacts with the inboard and outboard tubular members so that all three tubular members rotate together about the common axis, and a disengaged position in which the third tubular member rotates with only one of the other two tubular members, means biasing the third tubular member into the engaged position, and actuator means moving under operator control to translate the third tubular member into the disengaged position.

2. The clutch of claim 1 wherein the third tubular member is rotationally locked to the inboard tubular member by the combination of a key formed on an external surface of one of those two tubular members and a keyway formed on an interior surface of the other of those two tubular members.

3. The clutch of claim 2 wherein the third tubular member comprises a first serrate surface portion adjacent an outboard end thereof and the outboard tubular member comprises a second serrate surface portion adjacent an inboard end thereof, the first and second serrate surfaces rotationally locking the third and outboard tubular members together when the third tubular member is translated into the engaged position.

4. The clutch of claim 2 wherein the means biasing the third tubular member comprise a plurality of springs and wherein the actuator means comprise a clutch fork pivotally attached to the rotary tiller, a cable pivoting the clutch fork against the biasing springs, and a manually actuated caliper applying tension to the cable.

5. A method of installing a clutch on a driven shaft of a rotary tiller, the clutch comprising inboard, intermediate, and outboard tubular members having a common axis of rotation with the driven shaft when installed thereon, the inboard and the outboard tubular members connected by means permitting rotation therebetween and prohibiting axial translation therebetween, the intermediate tubular member rotationally locked to the inboard tubular member and translating along the axis between an engaged position in which the intermediate tubular member coacts with the inboard and outboard tubular members so that all three tubular members rotate together about the axis, and a disengaged position in which the intermediate tubular member rotates with only one of the other two tubular members, the rotary tiller further comprising a wheel having a stub axle extending therefrom, the stub axle having a transverse throughhole, and the driven shaft having a transverse throughhole; the method comprising the steps of:

a) inserting the driven shaft into the inboard tubular member;

b) translating the intermediate tubular member into the disengaged position;

c) inserting a first fastener through a throughhole in the inboard tubular member and through the throughhole in the driven shaft, thereby affixing the inboard tubular member to the driven shaft;

d) inserting the stub axle into the outboard tubular member;

e) inserting a second fastener through a hole in the outboard tubular member and into the throughhole in the stub axle, thereby affixing the outboard tubular member to the stub axle.

6. The method of claim 5 wherein the method comprises an additional step a1 before step b of:

a1) rotating the outboard tubular member with respect to the intermediate tubular member into a predetermined rotational position in which an access hole in the intermediate tubular member is aligned with a clearance slot disposed on the inboard end of the outboard tubular member.

* * * * *